United States Patent
Labish

(10) Patent No.: US 6,829,795 B2
(45) Date of Patent: Dec. 14, 2004

(54) COVERED FOAM ARTICLE

(75) Inventor: John V. Labish, Macomb Township, MI (US)

(73) Assignee: Woodbridge Foam Corporation (CA)

( * ) Notice: Subject to any disclaimer, the term of this patent is extended or adjusted under 35 U.S.C. 154(b) by 0 days.

(21) Appl. No.: 10/263,757

(22) Filed: Oct. 4, 2002

(65) Prior Publication Data

US 2004/0064894 A1 Apr. 8, 2004

(51) Int. Cl.⁷ .............................................. A47C 16/00
(52) U.S. Cl. ........................................... 5/655.9; 5/653
(58) Field of Search ........................ 5/655.9, 740, 709, 5/653

(56) References Cited

U.S. PATENT DOCUMENTS 4,147,825 A * 4/1979 Talalay ....................... 428/138
5,802,646 A * 9/1998 Stolpmann et al. ............. 5/740
6,274,520 B1 * 8/2001 Cordell ........................ 442/381

* cited by examiner

Primary Examiner—Teri Pham Luu
Assistant Examiner—Fredrick Conley
(74) Attorney, Agent, or Firm—Katten Muchin Zavis Rosenman

(57) ABSTRACT

A foam article comprising: a foam element; and a trim cover comprising a finished outer layer and an inner layer in contact with the foam element, the inner layer comprising a material having a kinetic coefficient of friction with respect to the foam element of less than about 0.75 when measured pursuant to ASTM D1894-00 using the conditions set out in GM9206P. The foam article is advantageously suited for use in a vehicular application such as a car seat (seat bottom, seat back and the like). The invention allows for the production of improved quality products while mitigating and obviating the need for additional material and/or labor costs.

38 Claims, 4 Drawing Sheets

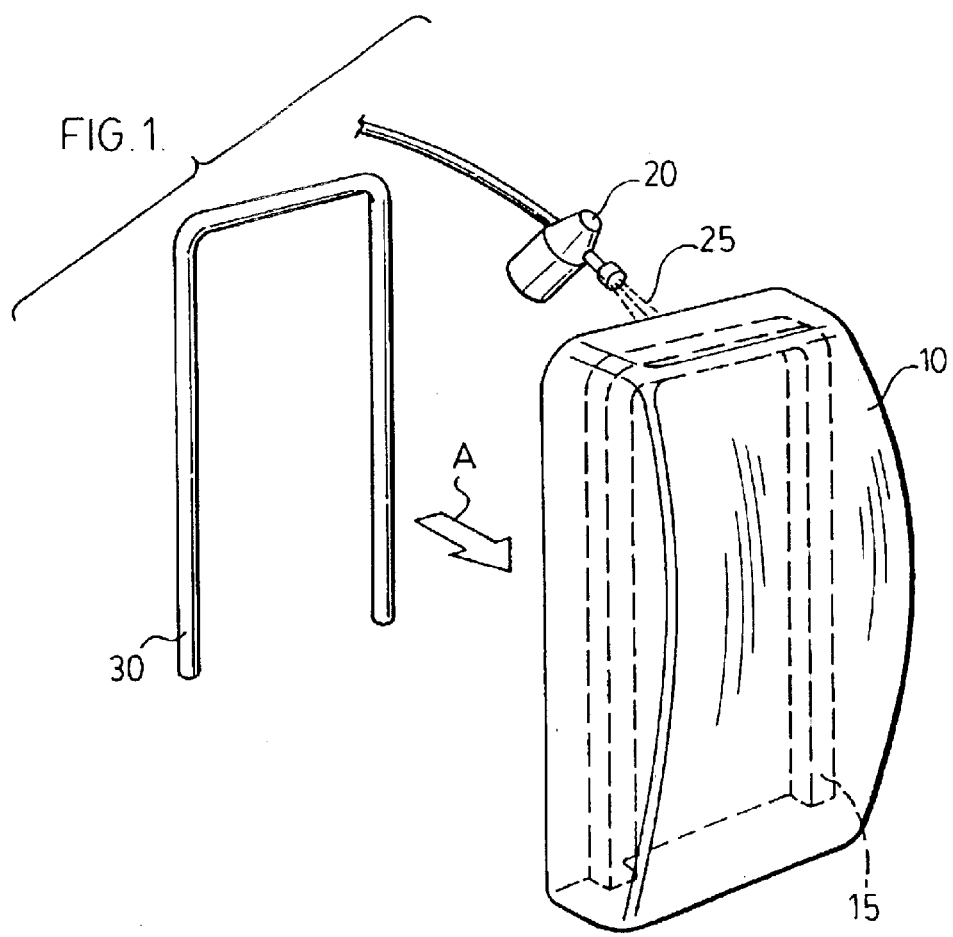
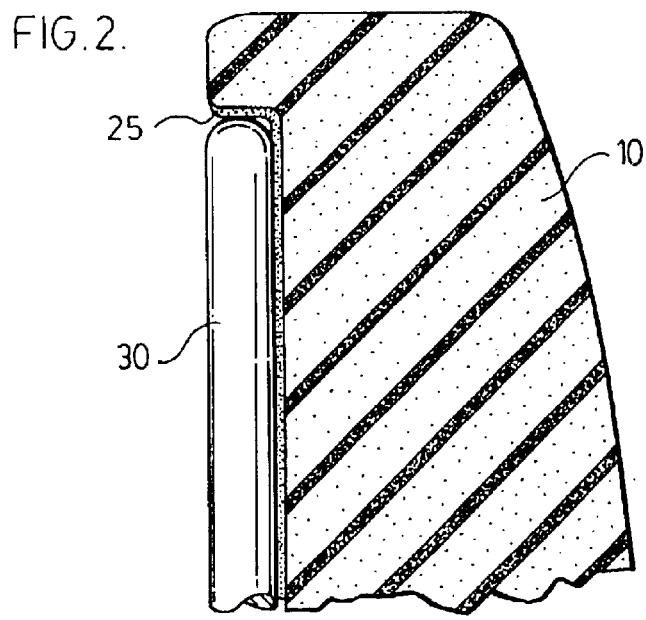

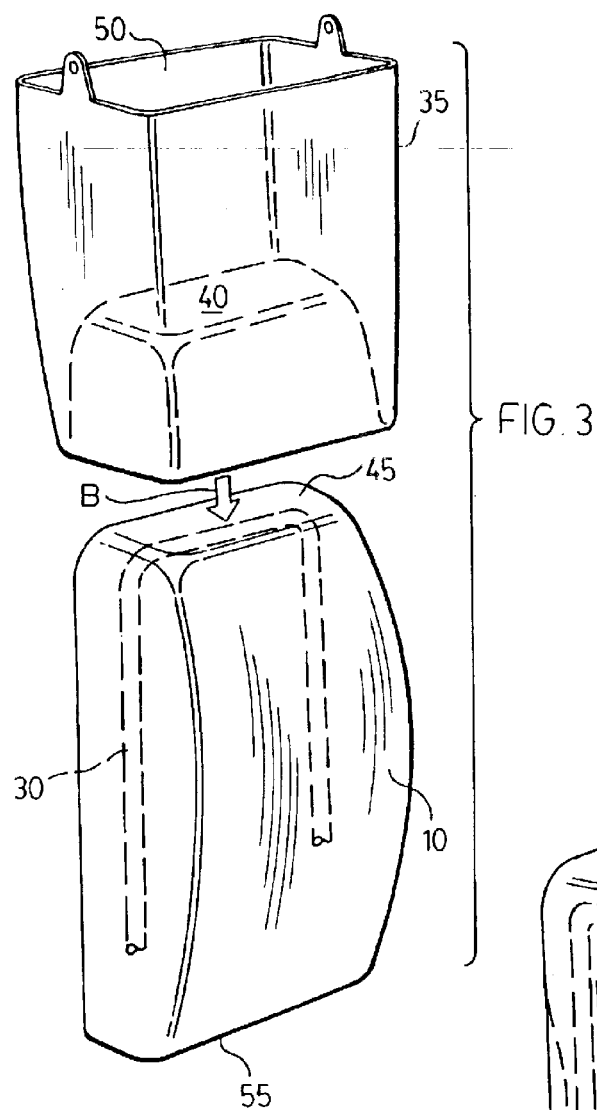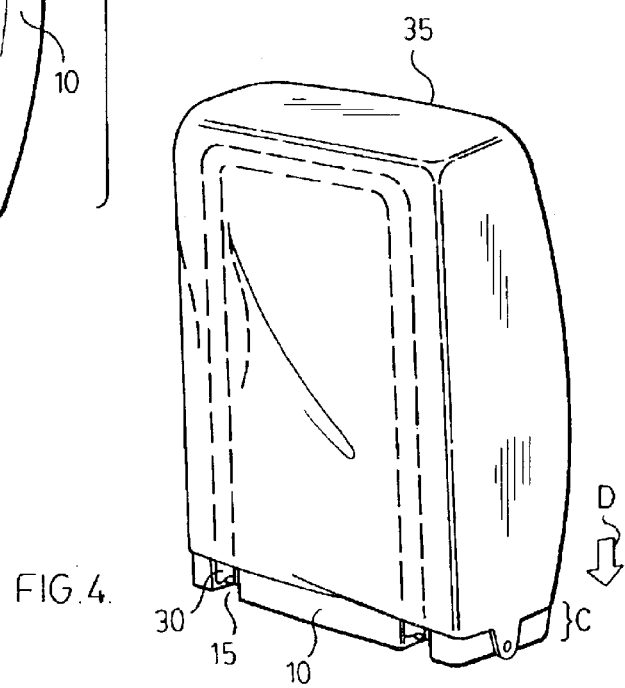

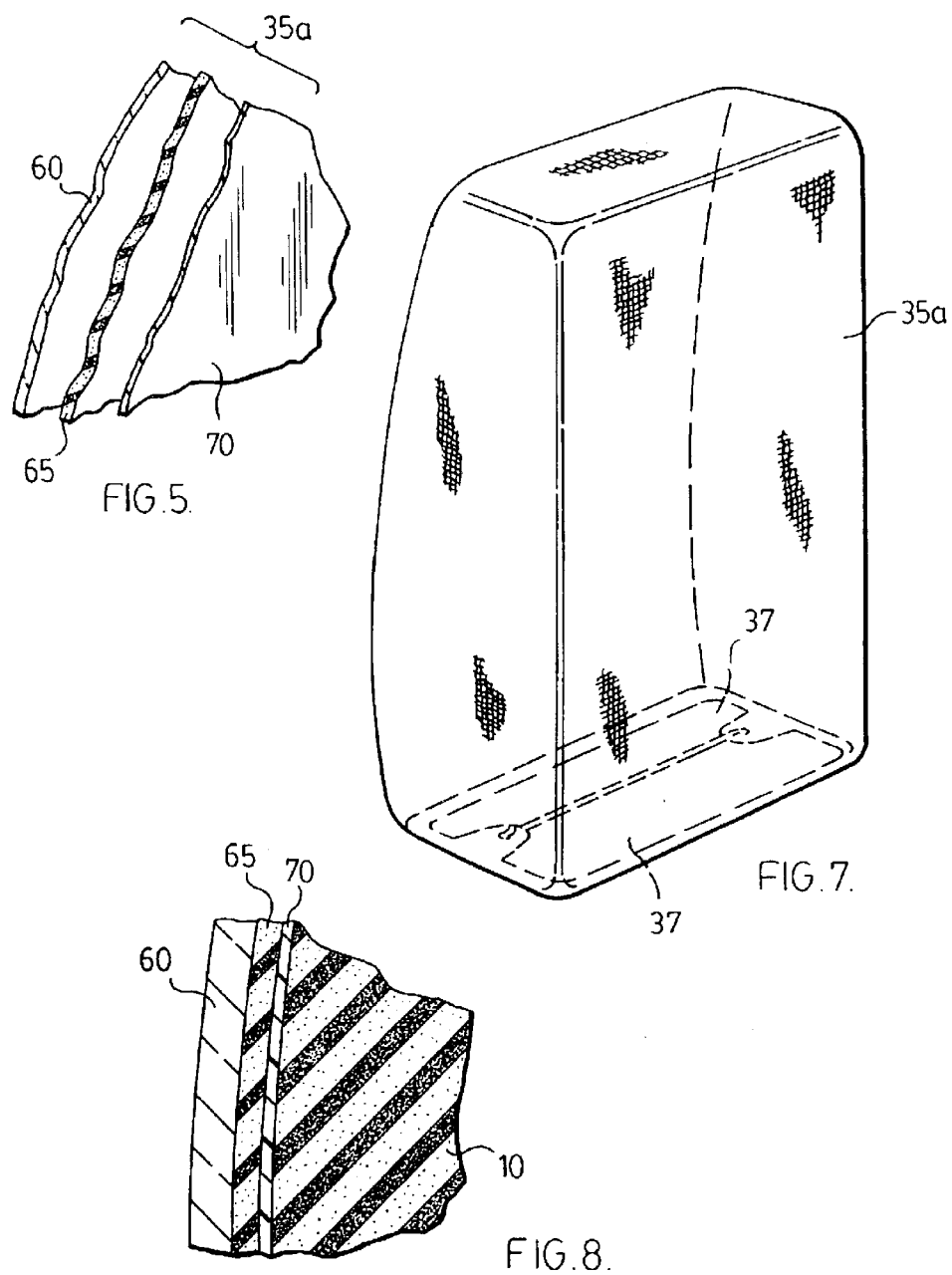

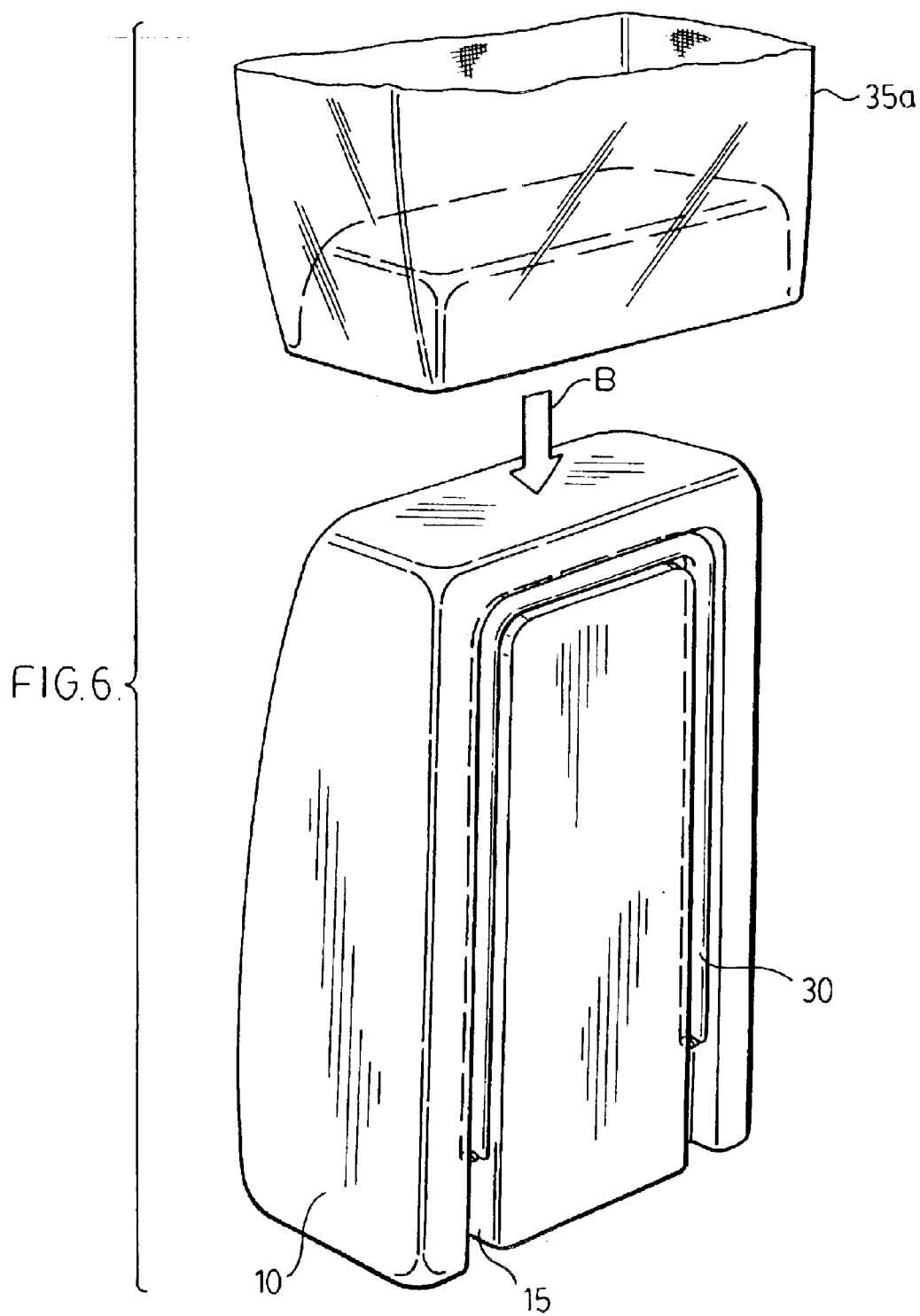

COVERED FOAM ARTICLE

BACKGROUND OF THE INVENTION

1. Field of the Invention

In one of its aspects, the present invention relates to a foam article. In another of its aspects, the present invention relates to a vehicular seat element. In yet another of its aspects, the present invention relates to a trim cover material particularly adapted for application to a foam element.

2. Description of the Prior Art

Foam articles are well known in the art.

Further, it is known to construct form articles from a foam element to which is applied a cover material that sometimes is termed as a "trim cover" in the art. The use of a trim cover applied to a foam element has gained widespread acceptance in the automotive industry. The trim cover can have a finished surface made of vinyl, cloth, leather and the like. The foam element is typically made from an isocyanate-based foam such as polyurethane. Of course, it is possible to construct the foam element from a cellular matrix material such as horse hair and the like.

In vehicular applications, it is common to employ foam articles in the seat of the vehicle. Typically a vehicular seat comprises two general elements. These are the seat bottom and the seat back. It is common for these elements to include a frame member coupled to the foam element and covered, at least partially, by the trim cover.

In recent years, the automotive industry has strived to improve the so-called "fit and finish" of all interior vehicular components, particularly the vehicle seats. In practice, this means striving to produce vehicular seats having narrower width channels or trenches and improving the overall appearance of the seat by creating a tighter fit between the trim cover and the foam element. A useful analogy is to consider striving to produce a vehicle seat where a trim cover fits the foam element "like a glove".

As will be described below, the desire of the automotive industry to produce such improved foam articles has lead to a variety of problems during manufacture of the articles. Particularly, a significant amount of additional material and/or labour is required to produce such articles. In some cases, even with additional labour and/or material, it is still difficult to attain the goals set by the automotive industry.

Accordingly, it would be desirable to have a foam article which has an improved "fit and finish" appearance and can be made without significantly increasing the amount of labor and/or material costs required to produce the article.

SUMMARY OF THE INVENTION

It is an object of the present invention to obviate or mitigate at least one of the above-mentioned disadvantages of the prior art.

It is another object of the present invention to provide a novel foam article.

It is yet another object of the present invention to provide a novel vehicular seat element.

It is yet another object of the present invention to provide a novel trim cover useful for the production of a foam article such as a vehicular seat element.

Accordingly, in one of its aspects, the present invention provides foam article comprising:

a foam element;

a trim cover comprising a finished outer layer; and a slip layer interposed between the foam element and the trim cover, the slip layer comprising a material having a kinetic coefficient of friction with respect to the foam element of less than about 0.75 when measured pursuant to ASTM D1894-00 using the conditions set out in GM9206P.

In another of its aspects, the present invention provides a vehicular seat element comprising:

a foam element;

a trim-cover comprising a finished outer layer; and a slip layer interposed between the foam element and the trim cover, the slip layer comprising a material having a kinetic coefficient of friction with respect to the foam element of less than about 0.75 when measured pursuant to ASTM D1894-00 using the conditions set out in GM9206P.

In yet another of its aspects, the present invention provides a trim cover comprising a finished outer layer and an inner layer, the inner layer comprising a material having a kinetic coefficient of friction with respect to the a foam element of less than about 0.75 when measured pursuant to ASTM D1894-00 using the conditions set out in GM9206P.

Thus, the present inventor has discovered that it is possible to produce a foam article having improved "fit and finish" without the need to significantly increase the cost of labour and/or materials. More specifically, it has been discovered that the use of a trim cover with an inner layer comprising a material with a prescribed kinetic coefficient of friction with respect to the foam element allows for the use of tighter fitting trim covers resulting in the production of a foam article with improved "fit and finish". The inner layer of the trim cover comprises a material having a kinetic coefficient of friction with respect to the foam element of less than about 0.75 when measured pursuant to ASTM D1894-00 using the conditions set out in GM9206P (the text of GM9206P is reproduced in the present application in the Appendix). The present foam article is particularly useful in vehicular applications such as in a vehicular seat element (e.g., one or both of a seat bottom and a seat back). Alternatively, the present foam article can be used in non-vehicular applications or in vehicular applications other than seat elements. The present foam article is particularly useful in applications where a foam element is completely or almost completely covered by a trim cover and the intent is to have a foam article with improved "fit and finish" or craftsmanship—e.g., an article having a tight fitting trim cover applied thereto.

The slip layer may be secure to the foam element or to the trim cover. Alternatively, the slip layer may be non-secure with respect to either of the foam element or trim cover. Preferably, the slip layer is secured to the trim cover.

BRIEF DESCRIPTION OF THE DRAWINGS

Embodiments of the present invention will be described with reference to the accompanying drawings, wherein like reference numerals denote like parts, and in which:

FIGS. 1–4 illustrate production of a foamed article using a conventional approach; and FIGS. 5–8 illustrate production of a preferred embodiment of the present foamed article.

DETAILED DESCRIPTION OF THE PREFERRED EMBODIMENTS

Prior to describing the preferred embodiments of the present invention, a description of a prior art approach for producing a covered foam article is provided to facilitate understanding the problems associated with the prior art.

Thus, with reference to FIGS. 1–4, a conventional process for application of a trim cover to a foam element is set out.

Initially, a foam element 10 is provided. Foam element 10 may be produced in a mold or other conventional device. Typically, foam element 10 is made from an isocyanate-based foam such as a polyurethane foam. In the illustrated embodiment, foam element 10 is in the shape of a seat back typically used in the vehicular application.

As shown, foam element 10 has molded therein a U-shaped trench 15.

In an initial step in the process, a spray dispensing device 20 (or other equivalent device) is used to dispense an adhesive 25 primarily in trench 15 of foam element 10.

Next, a metal frame element 30 is moved in the direction of arrow A and placed in trench 15 of foam element 10.

With reference to FIG. 2, once frame element 30 is position in trench 15 of foam element 10, frame element 30 contacts adhesive 25 and is secured to foam element 10.

With reference for FIG. 3, a trim cover 35 is disposed above the combination of frame element 30 and foam element 10. It is known in the art to incorporate an inner layer (not shown) or slip sheet in trim cover 35. This inner layer or slip sheet may comprise one or more of the following: foam, angel hair, polymer layers and the like. The inner layers or slip sheets used to date have a relatively high kinetic coefficient of friction with respect to foam element 10. As shown, trim cover 35 is initially inverted so that the inner surface thereof is exposed. Next, trim cover 35 is lowered onto foam element 10 (having frame element 30 secured thereto) in the direction of arrow B. Once an upper surface 40 of trim cover 35 contacts foam element 10 trim cover 35 is "rolled" or otherwise moved such that an opening 50 of trim cover 35 is in alignment with a bottom portion 55 of foam element 10. It should be noted that there are devices in the art which can perform the step illustrated in FIG. 3. Since these devices are conventional, they will not be discussed further herein.

It is worthwhile to note that the use of adhesive 25 to secure frame element 30 to foam element 10 is done primarily for the purpose of securing frame element 30 in place during the covering step illustrated in FIG. 3. In other words, the use of adhesive 25 is not required to secure frame element 30 to foam element 10 after production and installation of the vehicle seat.

With reference to FIG. 4, the covered foam article produced from FIG. 3 is shown. As illustrated, a portion C of foam element 10 protrudes from trim cover 35. The reason for this is as follows. When it is desired to produce a covered foam article having improved "fit and finish" qualities, trim cover 35 becomes a much tighter fit with respect to foam element 10. The result of using a conventional device to apply trim cover 35 to foam element 10, as shown in FIG. 3, is protrusion of portions C from trim cover 35 (e.g., due to upper surface 40 of trim cover 35 not contacting an upper surface 45 of foam element 10 prior to "unrolling" of trim cover 35). Thus, it becomes necessary to employ one or more individuals to manually pull or finesse trim cover 35 in the direction of arrow D to finish the covering step and the production of the covered foam article.

Thus, it will be seen from the above description that the prior art technique of producing a covered foam article necessitates the use of extra materials (adhesive 25 to secure frame element 30 to foam element 10 during the cover step) and labour (one or more individuals to pull trim cover 35 in the direction of arrow D to cover protrusion of portion C of foam element 10).

With reference to FIGS. 5–8, a particularly preferred embodiment of the present foam article will be described. Thus, with reference to FIG. 5, there is illustrated a preferred embodiment of a trim cover 35a useful to produce the present foam article. Thus, trim cover 35a comprises an outer layer 60, an intermediate layer 65 and an inner layer 70.

Outer layer 60 of trim cover 35a is conventional and can be made of any desirable material such as cloth, vinyl, leather and the like. Intermediate layer 65 is optional. If present, intermediate layer 65 preferably comprises a foam, more preferably an isocyanate-based foam, most preferably a polyurethane foam.

Intermediate layer 65 may be secured to outer layer 60 in a conventional manner. For example, it is possible to secure intermediate layer 65 to outer layer 60 using an adhesive or similar material. Alternatively, it is possible to flame laminate, hot roll laminate, adhesive laminate or otherwise secure intermediate layer 65 to outer layer 60. Inner layer 70 is provided and may be secured to intermediate layer 65 or the combination of outer layer 60 and intermediate layer 65 using any of the means discussed above. Alternatively, inner layer 70 may be sewn (or otherwise mechanically fastened) to the combination of outer layer 60 and intermediate layer 65.

Inner layer 70 is comprised of a material having a kinetic coefficient of friction with respect to foam element 10 of less than about 0.75 when measured pursuant to ASTM D1894-00 using the conditions set out in GM 9206P (see the Appendix hereto). Preferably, inner layer 70 comprises a material having a kinetic coefficient of friction with respect to foam element 10 of less than about 0.73, more preferably in the range of from about 0.50 to about 0.73, more preferably in the range of from about 0.55 to about 0.73, more preferably in the range of from about 0.60 to about 0.70, more preferably in the range of from about 0.50 to about 0.65, when measure pursuant to ASTM D1894-00 using the conditions set out in GM 9206P.

Preferably, inner layer 70 comprises a polymer material, more preferably a polyester, a polypropylene or a mixture of a polyester and a polypropylene. It is possible to incorporate in the polymer material an additive or slip agent which serves to confer to inner layer 70 sufficient smoothness to provide a kinetic coefficient of friction with respect to foam element 10 of less than about 0.75 as set out above.

Preferably, inner layer 70 is constructed to be in the form of a non-woven scrim.

A suitable such material is available from Alhstrom Corporation as Grade 27500 Scrim.

With reference to FIG. 6, frame element 30 is placed in trench 15 of foam element 10—the use of an adhesive to secure frame element 30 in place is not required. Trim cover 35a is inverted in a manner similar to that illustrated in FIG. 3 and lowered over foam element 10 in the direction of arrow B. Thereafter, trim cover 35a is applied to cover foam element 10 in the same manner as described above. Due to the selection of inner layer 70 to have the prescribed coefficient of friction with respect to the foam element set out above, it is possible to "unroll" trim cover 35a over foam element 10 without misaligning frame element 30 and without resulting in having a portion of foam element 10 protrude from the opening of trim cover 35a.

Thereafter, a pair of bottom flaps 37 in trim cover 35a may be folded and sealed to complete production of the covered foam element.

Thus, the use of trim cover 35a allows for facilitating the production of a covered foam element having improved "fit and finish" or craftsmanship without the requirement of using additional materials such as adhesives and/or additional labour as described above with reference to FIGS. 1–4. Such improved craftsmanship may be manifested in one or more of: production of foam articles with reduced occurrence of visible wrinkling of the trim cover; the ability of use tighter fitting trim covers; the production of parts having the appearance of relatively straight seams; the production of parts where the seams are aligned in the finished product; and/or facilitation of finessing the product (if required) during post-covering operations. Other advantages will be apparent to those of skill in the art having the present specification in hand.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

APPENDIX

Coefficients of Friction of Soft Trim Material

GM9206P

1. SCOPE This procedure is used to determine the coefficients of friction of materials using ASTM D1894, Method A or B.
NOTE: If a strain gage is used to determine the friction, slightly higher results will be obtained because of the pulleys.
2. Equipment Required
2.1 Surface Friction Tester. Custom Scientific Instrument Model #CS-152S, 13 Wing Drive, Cedar Knolls, N.J. 07927.
2.1.1 Weight of sled, 300 g (foam coated)
2.1.2 Speed of moving plane, 300 mm/minute
2.2 Humidity cabinet
2.3 Clean, white, cheesecloth
2.4 Chlorothane, 9981224
2.5 Pressure sensitive tape, double backed
2.6 Polyethylene bag
2.7 Teflon cloth (NOTE: Teflon cloth was replaced with a sample of foam (i.e., equivalent to the foam element discussed above) having the following dimensions: 3×12×½)
3. Test Procedure
3.1 Before testing, condition all samples to be tested in the humidity cabinet at 21 C. and 50% RH for a period of 4 h. After conditioning, samples may be stored in the polyethylene bag for a maximum for a period of 1 h.
3.1.1 On the moving plane of the testing machine, place the sheet of teflon using the pressure sensitive tape.
3.1.2 Clean the surface of the teflon with the chlorothane and cheesecloth. Wipe the cleaned surface with a dry piece of cloth to make sure that no residue remains.
NOTE: This should be done 4 h prior to any testing, preferably at the end of each days usage to provide ample time to dry.
3.1.3 On the underside of the sled, on top of the foam, place a 64×64 mm piece of pressure sensitive tape.
3.1.4 Place a precut 64×100 mm sample, uncoated side, against the tape on the underside of the sled allowing the flap to be wrapped around the front edge of the sled and attached to the metal with a piece of tape.
3.1.5 Place the sled with the sample attached on the teflon cloth, coated side down, and start the machine.
3.1.6 Three tests will be conducted on the same piece of coated material and the average of the three tests will be the amount of friction found in grams
NOTE: Static readings will not be used and should be disregarded when averaging the results.

What is claimed is:

1. A foam article comprising:
   a foam element;
   a trim cover comprising a finished outer layer;
   a slip layer interposed between the foam element and the trim cover, the slip layer comprising a material having a kinetic coefficient of friction with respect to the foam element of less than about 0.75 when measured pursuant to ASTM D1894-00 using the conditions set out in GM9206P; and
   an intermediate foam layer disposed between the finished outer layer and the slip layer.

2. The foam article defined in claim 1, wherein the slip layer comprises a material having a kinetic coefficient of friction with respect to the foam element of less than about 0.73 when measured pursuant to ASTM D1894-00 using the conditions set out in GM9206P.

3. The foam article defined in claim 1, wherein the slip layer comprises a material having a kinetic coefficient of friction with respect to the foam element in the range of from about 0.50 to about 0.73 when measured pursuant to ASTM D1894-00 using the conditions set out in GM9206P.

4. The foam article defined in claim 1, wherein the slip layer comprises a material having a kinetic coefficient of friction with respect to the foam element in the range of from about 0.55 to about 0.73 when measured pursuant to ASTM D1894-00 using the conditions set out in GM9206P.

5. The foam article defined in claim 1, wherein the slip layer comprises a material having a kinetic coefficient of friction with respect to the foam element in the range of from about 0.60 to about 0.70 when measured pursuant to ASTM D1894-00 using the conditions set out in GM9206P.

6. The foam article defined in claim 1, wherein the slip layer comprises a material having a kinetic coefficient of friction with respect to the foam element in the range of from about 0.50 to about 0.65 when measured pursuant to ASTM D1894-00 using the conditions set out in GM9206P.

7. The foam article defined in claim 1, wherein the foam element comprises an isocyanate-based foam.

8. The foam article defined in claim 1, wherein the foam element comprises a polyurethane foam.

9. The foam article defined in claim 1, wherein the material comprises a polymer layer.

10. The foam article defined in claim 9, wherein the polymer layer comprises a polyester.

11. The foam article defined in claim 9, wherein the polymer layer comprises a polypropylene.

12. The foam article defined in claim 9, wherein the polymer layer comprises a mixture of polyester and polypropylene.

13. The foam article defined in claim 9, wherein the polymer layer is in the form of a scrim.

14. The foam article defined in claim 1, wherein the intermediate foam layer comprises an isocyanate-based foam.

15. The foam article defined in claim 1, wherein the intermediate foam layer comprises a polyurethane foam.

16. The foam article defined in claim 1, further comprising a frame element secured with respect to the foam element.

17. A vehicular seat element comprising:
a foam element;
a trim cover comprising a finished outer layer;
a slip layer interposed between the foam element and the trim cover, the slip layer comprising a material having a kinetic coefficient of friction with respect to the foam element of less than about 0.75 when measured pursuant to ASTM D1894-00 using the conditions set out in GM9206P; and
an intermediate foam layer disposed between the finished outer layer and the slip layer.

18. A trim cover comprising a finished outer layer, an inner layer, and an intermediate foam layer disposed between the finished outer layer and a slip layer, the inner layer comprising a material having a kinetic coefficient of friction with respect to a foam element of less than about 0.75 when measured pursuant to ASTM D1894-00 using the conditions set out in GM9206P.

19. The vehicular seat element defined in claim 17, wherein the slip layer comprises a material having a kinetic coefficient of friction with respect to the foam element of less than about 0.73 when measured pursuant to ASTM D1894-00 using the conditions set out in GM9206P.

20. The vehicular seat element defined in claim 17, wherein the slip layer comprises a material having a kinetic coefficient of friction with respect to the foam element in the range of from about 0.50 to about 0.73 when measured pursuant to ASTM D1894-00 using the conditions set out in GM9206P.

21. The vehicular seat element defined in claim 17, wherein the slip layer comprises a material having a kinetic coefficient of friction with respect to the foam element in the range of from about 0.55 to about 0.73 when measured pursuant to ASTM D1894-00 using the conditions set out in GM9206P.

22. The vehicular seat element defined in claim 17, wherein the slip layer comprises a material having a kinetic coefficient of friction with respect to the foam element in the range of from about 0.60 to about 0.70 when measured pursuant to ASTM D1894-00 using the conditions set out in GM9206P.

23. The vehicular seat element defined in claim 17, wherein the slip layer comprises a material having a kinetic coefficient of friction with respect to the foam element in the range of from about 0.50 to about 0.65 when measured pursuant to ASTM D1894-00 using the conditions set out in GM9206P.

24. The vehicular seat element defined in claim 17, wherein the material comprises a polymer layer.

25. The vehicular seat element defined in claim 24, wherein the polymer layer comprises a polyester.

26. The vehicular seat element defined in claim 24, wherein the polymer layer comprises a polypropylene.

27. The vehicular seat element defined in claim 24, wherein the polymer layer comprises a mixture of polyester and polypropylene.

28. The vehicular seat element defined in claim 24, wherein the polymer layer is in the form of a scrim.

29. The trim cover defined in claim 18, wherein the slip layer comprises a material having a kinetic coefficient of friction with respect to the foam element of less than about 0.73 when measured pursuant to ASTM D1894-00 using the conditions set out in GM9206P.

30. The trim cover defined in claim 18, wherein the slip layer comprises a material having a kinetic coefficient of friction with respect to the foam element in the range of from about 0.50 to about 0.73 when measured pursuant to ASTM D1894-00 using the conditions set out in GM9206P.

31. The trim cover defined in claim 18, wherein the slip layer comprises a material having a kinetic coefficient of friction with respect to the foam element in the range of from about 0.55 to about 0.73 when measured pursuant to ASTM D1894-00 using the conditions set out in GM9206P.

32. The trim cover defined in claim 18, wherein the slip layer comprises a material having a kinetic coefficient of friction with respect to the foam element in the range of from about 0.60 to about 0.70 when measured pursuant to ASTM D1894-00 using the conditions set out in GM9206P.

33. The trim cover defined in claim 18, wherein the slip layer comprises a material having a kinetic coefficient of friction with respect to the foam element in the range of from about 0.50 to about 0.65 when measured pursuant to ASTM D1894-00 using the conditions set out in GM9206P.

34. The trim cover defined in claim 18, wherein the material comprises a polymer layer.

35. The trim cover defined in claim 34, wherein the polymer layer comprises a polyester.

36. The trim cover defined in claim 34, wherein the polymer layer comprises a polypropylene.

37. The trim cover defined in claim 34, wherein the polymer layer comprises a mixture of polyester and polypropylene.

38. The trim cover defined in claim 34, wherein the polymer layer is in the form of a scrim.

\* \* \* \* \*